Feb. 18, 1930.  J. M. SKELTON  1,747,327
BUTTER CUTTER
Filed July 11, 1929  2 Sheets-Sheet 1
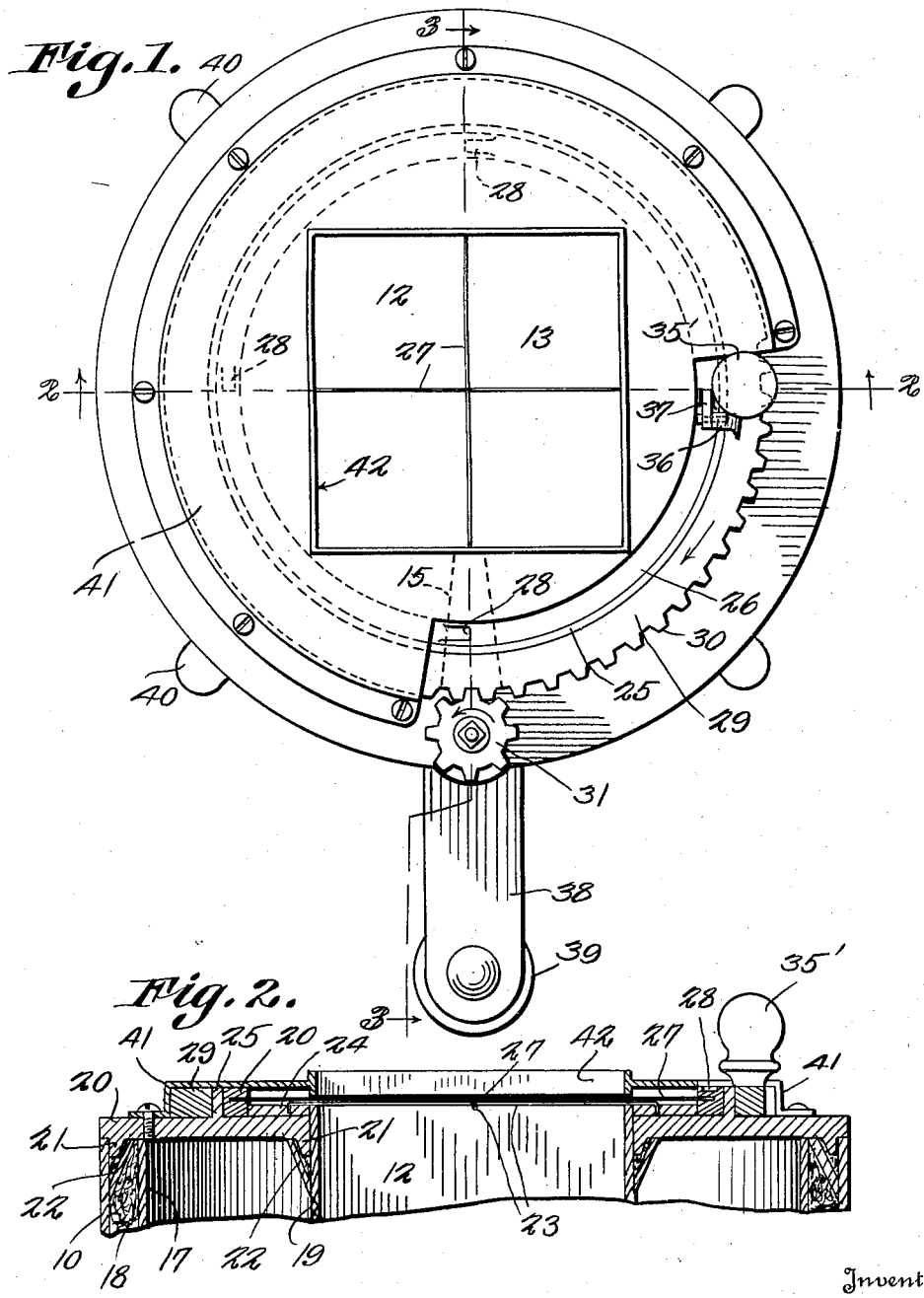
Inventor
Julian M. Skelton.
By E. Walton Brewington
Attorney Feb. 18, 1930.  J. M. SKELTON  1,747,327
BUTTER CUTTER
Filed July 11, 1929   2 Sheets-Sheet 2
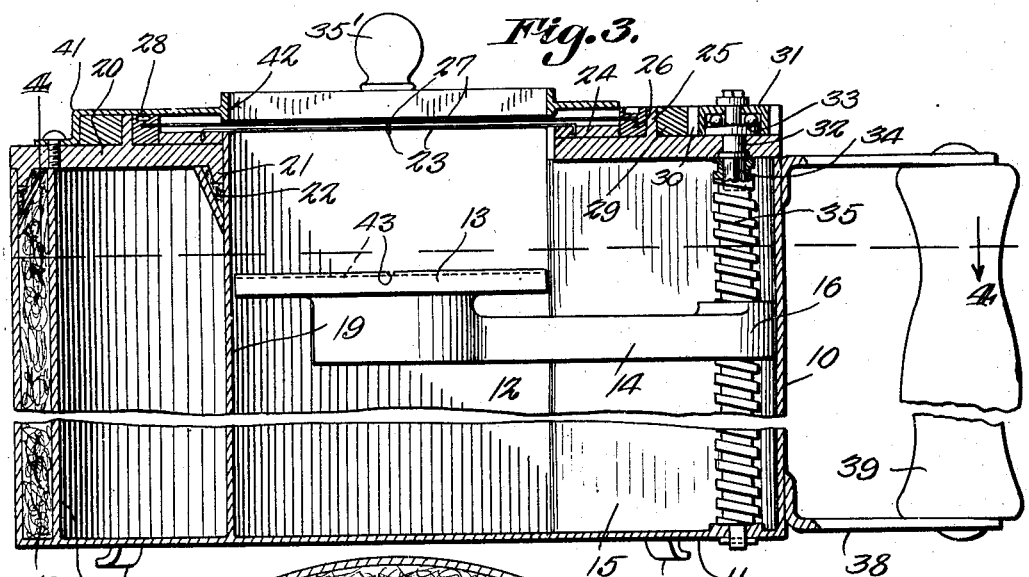
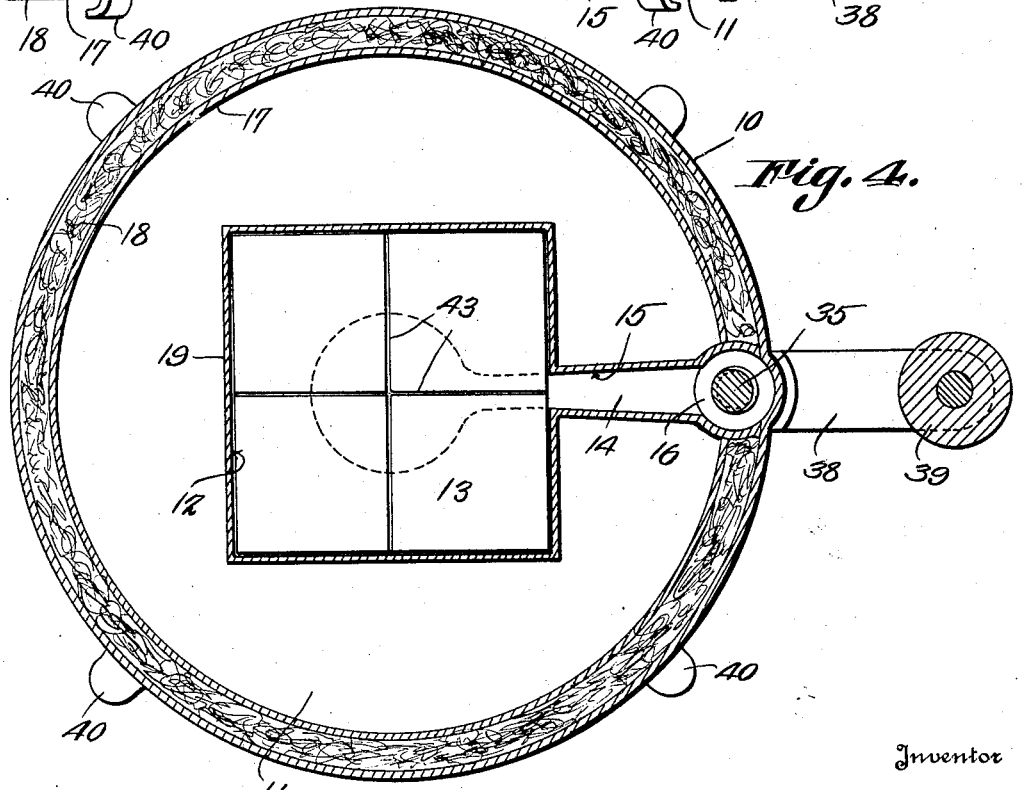
Inventor
Julian M. Skelton
By C. Walton Brewington
Attorney Patented Feb. 18, 1930

1,747,327

UNITED STATES PATENT OFFICE

JULIAN M. SKELTON, OF BALTIMORE, MARYLAND

BUTTER CUTTER

Application filed July 11, 1929. Serial No. 377,424.

This invention relates to dispensing devices and has special reference to a portable butter cutter.

In hotels, restaurants and other like places it is customary to employ some means for dispensing the butter served to the guests in pieces of even size. For this purpose it has been customary to employ butter cutters, usually located in the service room, for cutting the butter into small squares of even thickness. The butter thus cut up is frequently kept in a bowl of ice water and has to be lifted from the bowl and placed on the butter plates when serving. These squares, under these conditions, get out of shape and present a more or less unsightly appearance when served.

One important object of the present invention is to provide an improved butter cutter which may be carried from table to table so that the butter may be cut and immediately dispensed, thus assuring the guests of cleanliness in handling and also preserving the neatness of the freshly cut pieces of butter.

A second important object of the invention is to provide an improved feeding and cutting mechanism for such a device.

A third important object of the invention is to provide an improved device of this character wherein the blocks of butter being cut will be maintained at a proper low temperature so that it may remain hard and thus be neatly cut.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a plan view of the improved butter cutter.

Figure 2 is a detail section of the upper part of the device on the line 2—2 of Figure 1.

Figure 3 is a section on the line 3—3 of Figure 1, partly broken away.

Figure 4 is a section on the line 4—4 of Figure 3.

In the embodiment of the invention herein shown there is provided an outer casing having a cylindrical side wall 10 and a bottom 11, extending upwardly from the bottom is a centrally disposed butter receiving chamber 12 rectangular in plan so that the ordinary pound print or block of butter may be inserted in this chamber. Vertically movable in the chamber is a platform 13 on which the lower end of the pound print may rest, this platform being supported on an arm 14 which extends toward the wall 10 through a vertical guide slot 15 enlarged at its outer end to accommodate a nut 16 formed on the outer end of the arm 14. Extending upwardly from the bottom from one wall of the slot 15 to the other is an inner casing wall 17 and between the walls 10 and 17 is an insulating packing 18 so that the space between the wall 17 and the walls 19 of the chamber 12 may be used for packing ice or other refrigerant. This space for the ice is closed normally by a cover 20 which closely surrounds the walls 19 and is provided with a flange 21 extending downwardly into a trough like member 22 carried by said walls 19. On top of this cover and extending across the chamber 12 is a pair of wires 23 intersecting each other at right angles in the center of the chamber and having their ends fixed in a plate or ring 24. Also projecting upwardly from the cover 20 is an annular rib 25 and between the rib 25 and the plate 24 is revolubly mounted a ring 26 which carries cross wires 27 positioned above the wires 23. Four notches or ratchet teeth 28 are formed on the upper face of this ring 26. Surrounding the rib 25 is a ring 29 which, for substantially one quarter of its circumference, is provided with gear teeth 30 which mesh with a gear 31 fitted revolubly on the upper end of a stub shaft 32 and connected thereto by an ordinary ball clutch 33 so that revolution of the gear 31 in one direction will revolve the stub shaft while the gear may revolve in the opposite direction without affecting the stub shaft. This shaft 32 is carried by the top 20 and is provided with a squared lower end 34 engaging in a squared opening formed on an elevating screw 35 which passes through the nut 16 so that when the top is in position and the ring 29 is moved in the direction of the arrow in Figure 1 the screw 35 will be rotated and the platform 13 thus moved upwardly while movement of the ring 29 in the opposite direction will not affect the position of the platform 13. On the ring 29 is mounted an operating handle 35' and also there is mounted on this ring a bracket 36 which projects over the ring 26 and carries a dog or pawl 37 engageable in the respective notches or ratchet teeth 28.

Projecting laterally from the wall 10 opposite the gear 31 are brackets 38 and between these brackets is supported a carrying handle 39. Moreover, the casing is preferably supported on feet 40.

Carried by the cover 20 is a cap plate 41 provided centrally with a walled opening 42 corresponding in size and position to the cross section of the chamber 12 and forming an extension of that chamber above the wires 23 and 27. It will be noted that grooves 43 are provided in the upper face of the platform 13 so that the platform may be raised high enough to take in the lower set of wires and thus enable the complete block of butter to be dispensed.

In the operation of the device the cover 20 is removed and the outer chamber packed with ice or other suitable refrigerant. An ordinary square ended key is inserted in the opening in the top of the screw 35 and the screw rotated in a clockwise direction to screw the platform 13 down to its lowest point. A block of butter is then placed in the chamber 12 resting on platform 13. The cover is now replaced and the device is ready for use. Upon the waiter reaching the table at which it is desired to dispense butter he sets the device down on the table and grasps the handle 35', moving it from the position shown in Figure 1 to a position at right angles thereto. This rotates the screw 35 in an anticlockwise direction and pushes the block up through the cross wires, the ring 26 and the cross wires 27 remaining stationary during this movement of the handle 35'. Upon the handle 35' reaching the limit of its movement in this direction the dog or pawl 37 drops into the notch or tooth 28 adjacent the gear 31 so that return of the knob 35 to its original position causes rotation of the ring 26 and the wires 27. It is to be understood that the movement upward of the platform 13 has pushed the upper end of the block into the opening 42 so that when the ring 26 moves with the knob 35 it cuts the pushed up and divided end of the block of butter off just below the opening 42 thus leaving four pieces or pats of butter ready for dispensing. Obviously, repetition of this oscillation of the handle 35' will continue the raising and cutting off operations until all of the butter has been dispensed.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a butter dispensing device, a casing for holding a block of butter and having an open end, a rotatable ring surrounding said open end, cross wires extending across said end and carried by said ring, a platform in said casing for suporting a block of butter, an elevating screw supporting said platform, an oscillatable operating handle, and means to connect the handle operatively to the screw upon movement of the handle in one direction and to the ring upon movement of the handle in the opposite direction.

2. In a butter dispensing device, a casing for holding a block of butter and having an open end, a rotatable ring surrounding said open end, cross wires extending across said end and carried by said ring, a platform in said casing for supporting a block of butter, an elevating screw supporting said platform, an oscillatable operating handle, an oscillatable second ring concentric to the first ring and carrying said handle, means to connect the rings upon movement of the second ring in one direction, and means to connect the second ring and screw upon movement of said second ring in the opposite direction.

3. In a butter dispensing device, a casing for holding a block of butter and having an open end, a rotatable ring surrounding said open end, cross wires extending across said end and carried by said ring, a platform in said casing for supporting a block of butter, an elevating screw supporting said platform, an oscillatable operating handle, an oscillatable second ring concentric to the first ring and carrying said handle, ratchet teeth formed on the first ring in quadrate relation, a dog carried by the second ring and engageable in said ratchet teeth upon movement of the second ring in one direction, and means to connect the second ring and screw upon movement of said second ring in the opposite direction.

4. In a butter dispensing device, a casing for holding a block of butter and having an open end, a rotatable ring surrounding said open end, cross wires extending across said end and carried by said ring, a platform in said casing for supporting a block of butter, an elevating screw supporting said platform, an oscillatable operating handle, an oscillatable second ring concentric to the first ring and carrying said handle, means to connect the rings upon movement of the second ring in one direction, a gear segment formed on said second ring, a gear revolubly mounted on said screw and meshing with said segment, and a ball clutch for engaging the gear and screw upon rotation of the former in one direction.

5. In a butter dispensing device, a casing for holding a block of butter and having an open end, a rotatable ring surrounding said open end, cross wires extending across said end and carried by said ring, a platform in said casing for supporting a block of butter, an elevating screw supporting said platform, an oscillatable operating handle, an oscillatable second ring concentric to the first ring and carrying said handle, ratchet teeth formed on the first ring in quadrate relation, a dog carried by the second ring and engageable in said ratchet teeth upon movement of the second ring in one direction, a gear segment formed on said second ring, a gear revolubly mounted on said screw and meshing with said segment, and a ball clutch for engaging the gear and screw upon rotation of the former in one direction.

6. In a butter dispensing device, a casing for holding a block of butter and having an open end, a rotatable ring surrounding said open end, cross wires extending across said end and carried by said ring, a platform in said casing for supporting a block of butter, an elevating screw supporting said platform, an oscillatable operating handle, an oscillatable second ring concentric to the first ring and carrying said handle, ratchet teeth formed on the first ring in quadrate relation, a dog carried by the second ring and engageable in said ratchet teeth upon movement of the second ring in one direction, a gear segment formed on said second ring, a gear revolubly mounted on said screw and meshing with said segment, a ball clutch for engaging the gear and screw upon rotation of the former in one direction, an extension conforming in size to said casing and supported in advance of said wires, and a second pair of cross wires fixed over the open end of said casing.

In testimony whereof I affix my signature.

JULIAN M. SKELTON.